(12) United States Patent
Kim

(10) Patent No.: US 9,065,102 B2
(45) Date of Patent: Jun. 23, 2015

(54) RECHARGEABLE BATTERY

(75) Inventor: Duk-Jung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 618 days.

(21) Appl. No.: 13/436,661

(22) Filed: Mar. 30, 2012

(65) Prior Publication Data

US 2013/0095373 A1    Apr. 18, 2013

(30) Foreign Application Priority Data

Oct. 14, 2011    (KR) .................. 10-2011-0105431

(51) Int. Cl.
| | |
|---|---|
| *H01M 2/30* | (2006.01) |
| *H01M 10/42* | (2006.01) |
| *H01M 2/08* | (2006.01) |

(52) U.S. Cl.
CPC . *H01M 2/08* (2013.01); *H01M 2/30* (2013.01)

(58) Field of Classification Search
CPC .................................. H01M 2/08; H01M 2/30
USPC .................. 429/178, 179, 180, 181, 184, 185
See application file for complete search history.

(56) References Cited

U.S. PATENT DOCUMENTS

| | | | |
|---|---|---|---|
| 2004/0018417 A1 | 1/2004 | Stack | |
| 2010/0227205 A1* | 9/2010 | Byun et al. | ...................... 429/61 |
| 2011/0244310 A1* | 10/2011 | Kim | .............................. 429/158 |
| 2012/0148884 A1* | 6/2012 | Kim | ................................ 429/61 |

FOREIGN PATENT DOCUMENTS

| | | |
|---|---|---|
| JP | 08-315802 A | 11/1996 |
| JP | 2002-260631 A | 9/2002 |
| JP | 2003-045305 A | 2/2003 |

* cited by examiner

*Primary Examiner* — Carlos Barcena
(74) *Attorney, Agent, or Firm* — Christie, Parker & Hale LLP

(57) ABSTRACT

A rechargeable battery including an electrode assembly including a positive electrode and a negative electrode; a case containing the electrode assembly; a cap plate covering an opening of the case; a terminal electrically connected to the electrode assembly; and a sealing member on the cap plate to seal between the terminal and the cap plate, the sealing member including a connection member arranged therein and electrically connecting the terminal and the cap plate.

13 Claims, 11 Drawing Sheets

RECHARGEABLE BATTERY

CROSS-REFERENCE TO RELATED APPLICATION

This application claims priority to and the benefit of Korean Patent Application No. 10-2011-0105431, filed on Oct. 14, 2011 in the Korean Intellectual Property Office, the entire content of which is incorporated herein by reference.

BACKGROUND

1. Field

Aspects of embodiments of the present invention relate to a rechargeable battery.

2. Description of the Related Art

A rechargeable battery is a battery that can be charged and discharged unlike a primary battery that is incapable of being charged. A rechargeable battery having low capacity is commonly used in a portable small electronic device, such as a mobile phone, a laptop computer, and a camcorder, and a battery having large capacity is widely used as power source for driving a motor, such as in an electric vehicle, a hybrid vehicle, and the like.

Recently, a high-power rechargeable battery that uses a non-aqueous electrolyte having high energy density is being developed, and the high-power rechargeable battery is formed of a large-capacity battery module in which a plurality of rechargeable batteries are coupled in series in order to be used to drive devices requiring large power, such as motors of electric vehicles or hybrid vehicles, for example.

A battery module generally includes a plurality of rechargeable batteries that are coupled in series, and the rechargeable battery may be formed having a cylindrical or an angular shape, for example.

In a battery where a case is electrically connected with a positive electrode, the case may be electrically connected with the positive electrode or negative electrode by electrically connecting a positive electrode terminal and a cap plate. In order to electrically connect the case with the positive electrode, there are problems in that a complicated structure is needed, and an assembling process is complicated. In addition, in the case where a member for connecting to the cap plate is fixed by welding, a problem in that the cap plate having a small thickness is deformed during the welding process may occur.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a rechargeable battery has an improved structure to electrically connect a terminal and a cap plate.

According to an exemplary embodiment of the present invention, a rechargeable battery includes: an electrode assembly including a positive electrode and a negative electrode; a case containing the electrode assembly; a cap plate covering an opening of the case; a terminal electrically connected to the electrode assembly; and a sealing member on the cap plate to seal between the terminal and the cap plate, the sealing member including a connection member arranged therein and electrically connecting the terminal and the cap plate.

The sealing member may include a base plate, and the connection member may include an upper connector protruding to an upper portion of the base plate, a lower connector protruding to a lower portion of the base plate, and an intermediate connection portion inserted in the base plate and connecting the upper connector and the lower connector. The connection member may include a metal plate, and the intermediate connection portion may be oblique with respect to the upper connector and the lower connector and bent at the upper connector and the lower connector.

The upper connector may include a protrusion protruding upwardly therefrom, and the lower connector may include a protrusion protruding downwardly therefrom. At least one of the protrusions may be formed by bending at least one of the upper connector or the lower connector.

The connection member may include a fuse having a smaller cross-sectional area than surrounding portions. The base plate may have a through-hole into which the terminal is inserted.

The base plate may have a connection hole into which the connection member is inserted, and an installation groove formed on the connection hole. The sealing member may further include a cover that is rotatably installed with respect to the base plate and is insertable into the installation groove.

The base plate may have a groove into which the upper connector is inserted. The rechargeable battery may further include a nut coupled to the terminal and installed on the sealing member, and the connection member may be electrically connected to the terminal via the nut.

The rechargeable battery may further include a connection plate on the sealing member and into which the terminal is inserted, and the connection member may be electrically connected to the terminal via the connection plate. The terminal may include a first terminal and a second terminal, the sealing member may be electrically connected to the first terminal, and the rechargeable battery may further include a short-circuit tap electrically connected to the second terminal, and a short-circuit member electrically connected to the cap plate and deformable due to an increase in an internal pressure of the case to be electrically connected to the short-circuit tap.

According to an aspect of embodiments of the present invention, a terminal and a cap plate of a rechargeable battery may be easily connected by using a sealing member in which a connection port, or connection member, is built or inserted. As such, a rechargeable battery according to embodiments of the present invention is particularly suited for application in an electric vehicle or a hybrid electric vehicle.

BRIEF DESCRIPTION OF THE DRAWINGS

The accompanying drawings, together with the specification, illustrate some exemplary embodiments of the present invention, and, together with the description, serve to explain aspects and principles of the present invention.

DESCRIPTION OF REFERENCE NUMERALS INDICATING SOME ELEMENTS IN THE DRAWINGS

Figure 1:
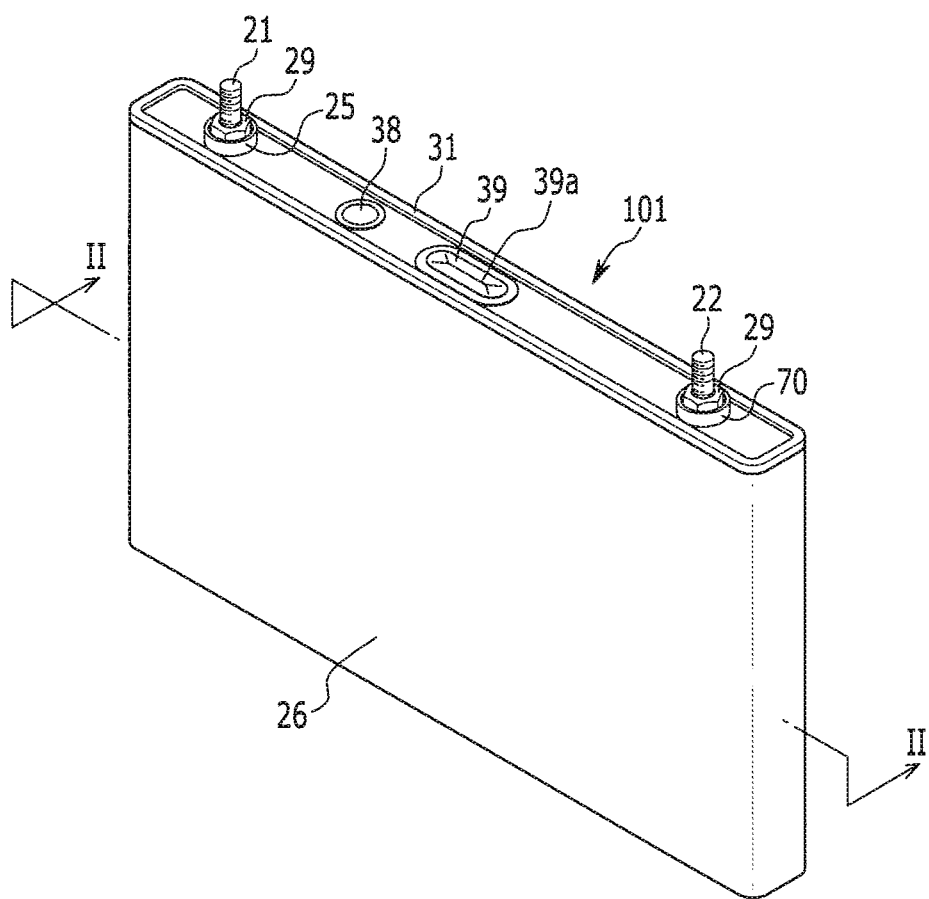
FIG. 1 is a perspective view of a rechargeable battery according to an exemplary embodiment of the present invention.

| | |
|---|---|
| 101, 102: Rechargeable battery | 10: Electrode assembly |
| 11: Negative electrode | 11a: Negative electrode uncoated region |
| 12: Positive electrode | 12a: Positive electrode uncoated region |
| 13: Separator | 21: First terminal |
| 22: Second terminal | 23: Washer |
| 24: Connection plate | 25: Upper gasket |
| 26: Case | 28: Lower gasket |
| 29: Nut | 30: Cap assembly |
| 31: Cap plate | 31a, 31b: Terminal hole |
| 35: Short-circuit hole | 38: Sealing stopper |
| 39: Vent plate | 39a: Notch |
| 41, 42: Current collecting tap | 61, 62: Lower insulating member |
| 70: Sealing member | 71: Base plate |
| 73: Through hole | 74: Cover |
| 75: Connection port | 75a: Upper connector |
| 75b: Lower connector | 75c: Intermediate connection portion |
| 76: Installation groove | 77: Connection hole |

DETAILED DESCRIPTION

The present invention will be described more fully hereinafter with reference to the accompanying drawings, in which some exemplary embodiments of the invention are shown and described. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
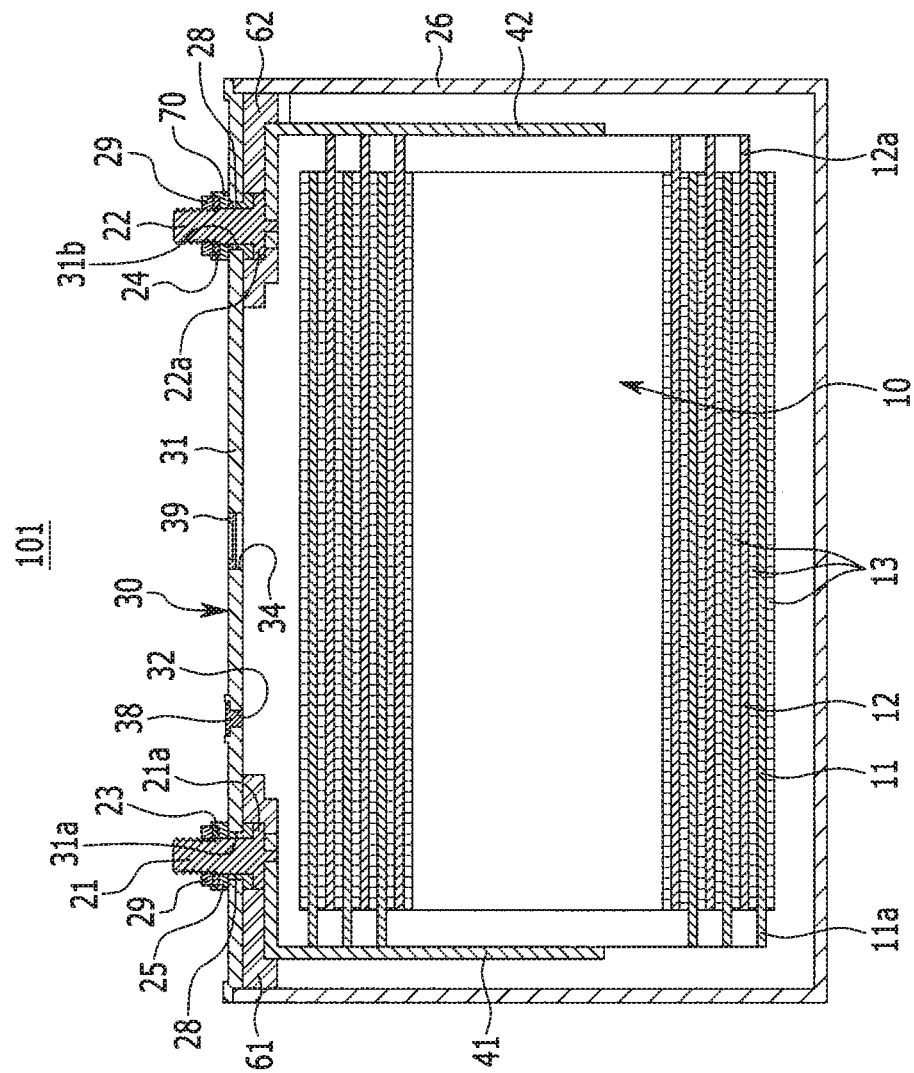
FIG. 2 is a cross-sectional view of the rechargeable battery of FIG. 1, taken along the line II-II.

FIG. 1 is a perspective view of a rechargeable battery according to an exemplary embodiment of the present invention, and FIG. 2 is a cross-sectional view of the rechargeable battery of FIG. 1, taken along the line II-II.

Referring to FIG. 1 and FIG. 2, a rechargeable battery 101 according to an exemplary embodiment of the present invention includes an electrode assembly 10 that is wound with a separator 13 interposed between a positive electrode 12 and a negative electrode 11, a case 26 in which the electrode assembly 10 is contained, and a cap assembly 30 that is combined with and covers an opening of the case 26.

The rechargeable battery 101 is described herein, as an example of one embodiment, with reference to an angular shape as a lithium ion rechargeable battery. However, the present invention is not limited thereto, and in other embodiments, a rechargeable battery according to the present invention may be any of various kinds of batteries, such as a lithium polymer battery or a cylindrical battery.

The negative electrode 11 and the positive electrode 12 include a coating region that is a region on which an active material is coated on a current collector formed by a metal foil of a thin plate, and an uncoated region that is a region on which an active material is not coated. A negative electrode uncoated region 11a is formed at a side end of one side of the negative electrode 11 along a lengthwise direction of the negative electrode 11, and a positive electrode uncoated region 12a is formed at a side end of another side of the positive electrode 12 along a lengthwise direction of the positive electrode 12. In one embodiment, the negative electrode 11 and the positive electrode 12 are spiral-wound with the separator 13 that is an insulator therebetween.

However, the present invention is not limited thereto, and in other embodiments, the electrode assembly 10 may have a structure in which the positive electrode and the negative electrode including a plurality of sheets are laminated with an insulator interposed therebetween.

The case 26, in one embodiment, is formed having a generally cuboid shape, and an opening is formed on a side thereof. The case 26, in one embodiment, may be formed of metal, such as aluminum or stainless steel, for example.

The cap assembly 30, in one embodiment, includes a cap plate 31 covering the opening of the case 26, a first terminal 21 that protrudes outside the cap plate 31 and is electrically connected to the negative electrode 11, and a second terminal 22 that protrudes outside the cap plate 31 and is electrically connected to the positive electrode 12.

The cap plate 31, in one embodiment, is formed having a long plate form connected in a direction and combined with the opening of the case 26. On the cap plate 31, a sealing stopper 38 that is installed in an electrolyte injection opening 32, and a vent plate 39 which is installed in a vent hole 34 and on which a notch 39a is formed to be opened at a certain pressure (e.g., a predetermined pressure) may be installed.

Terminal holes 31a and 31b into which the first and second terminals 21, 22 are respectively inserted are formed on the cap plate 31, and the first terminal 21 and the second terminal 22 are installed to protrude upwardly by passing through the cap plate 31. The first terminal 21, in one embodiment, is formed having a structure in which a terminal flange 21a protruding in a side direction at a lower portion of a pillar is formed, and the second terminal 22, in one embodiment, is also formed of a structure in which a terminal flange 22a protruding in a side direction at a lower portion of a pillar is formed.

In one embodiment, a nut 29 is combined with the first terminal 21, and a washer 23 is installed under the nut 29. In one embodiment, another nut 29 is combined with the second terminal 22, and a connection plate 24 having electrical conductivity is installed under the nut 29, and the nut 29 and the connection plate 24 are inserted into the second terminal 22.

In one embodiment, the first terminal 21 is electrically connected to the negative electrode 11 via a current collecting tap 41, and the second terminal 22 is electrically connected to the positive electrode 12 via another current collecting tap 42. However, the present invention is not limited thereto, and in another embodiment, the first terminal 21 may be electrically connected to the positive electrode, and the second terminal 22 may be electrically connected to the negative electrode.

In one embodiment, an upper gasket 25 for sealing is inserted into the first terminal 21, and the upper gasket 25 is disposed under the washer 23 and adhered to an upper surface of the cap plate 31. The upper gasket 25 insulates the first terminal 21 and the cap plate 31, and seals the terminal hole 31a. A lower gasket 28 for insulating is inserted at the terminal hole 31a between the cap plate 31 and the first terminal 21. The lower gasket 28, in one embodiment, is formed in a cylinder shape and formed such that a lower portion thereof is adhered to the terminal flange 21a by extending in a side direction.

In one embodiment, a lower insulating member 61 is installed between the cap plate 31 and the current collecting tap 41, and a groove into which the terminal flange 21a and the current collecting tap 41 are inserted is formed on the lower insulating member 61, such that the first terminal 21 and the current collecting tap 41 are supported and insulated.

When the nut 29 is combined with the first terminal 21, members installed between the nut 29 and the terminal flange 21a are adhered by the pressing of the nut 29 at the upper portion and the pressing of the terminal flange 21a at the lower portion, such that the terminal hole 31a is sealed.

A sealing member 70 for sealing is inserted with second terminal 22, and the sealing member 70 is disposed under the connection plate 24, adhered to the upper surface of the cap plate 31, and seals the terminal hole 31b. In one embodiment, another lower gasket 28 for insulating is inserted into the terminal hole 31b between the cap plate 31 and the second terminal 22. However, the present invention is not limited thereto, and in another embodiment, the sealing member 70 may be inserted into the terminal hole 31b.

The lower gasket 28, in one embodiment, is formed in a cylinder shape and formed such that a lower portion thereof is adhered to the terminal flange 22a by extending in a side direction. In one embodiment, a lower insulating member 62 for insulating the second terminal 22 and the current collecting tap 42 from the cap plate 31 is installed under the cap plate 31.

Figure 3:
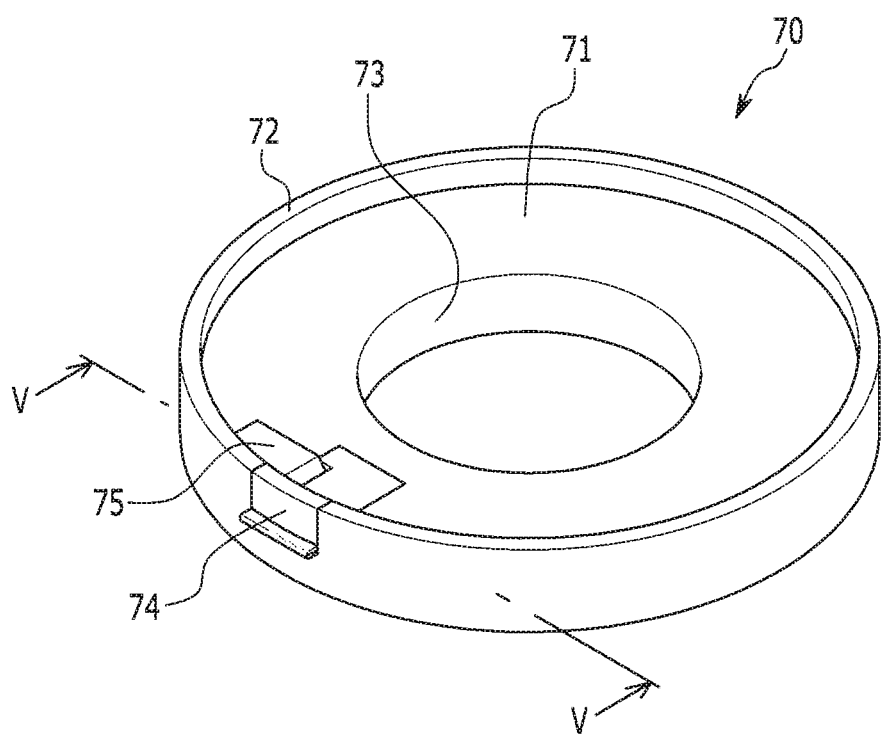
FIG. 3 is a perspective view of a sealing member of the rechargeable battery of FIG. 1.
Figure 4:
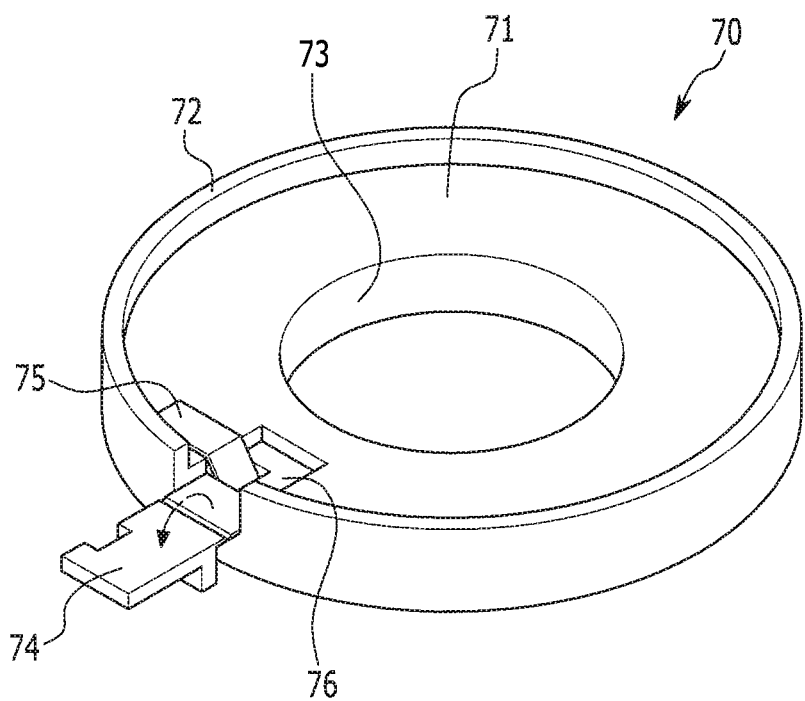
FIG. 4 is a perspective view of the sealing member of FIG. 3, showing a state in which a cover of the sealing member is in an opened position.

FIG. 3 is a perspective view of the sealing member 70 according to an exemplary embodiment of the present invention; FIG. 4 is a perspective view of the sealing member 70, showing a state in which a cover of the sealing member 70 is in an opened position, and FIG. 5 is a cross-sectional view of the sealing member 70, taken along the line V-V of FIG. 3.

Figure 5:
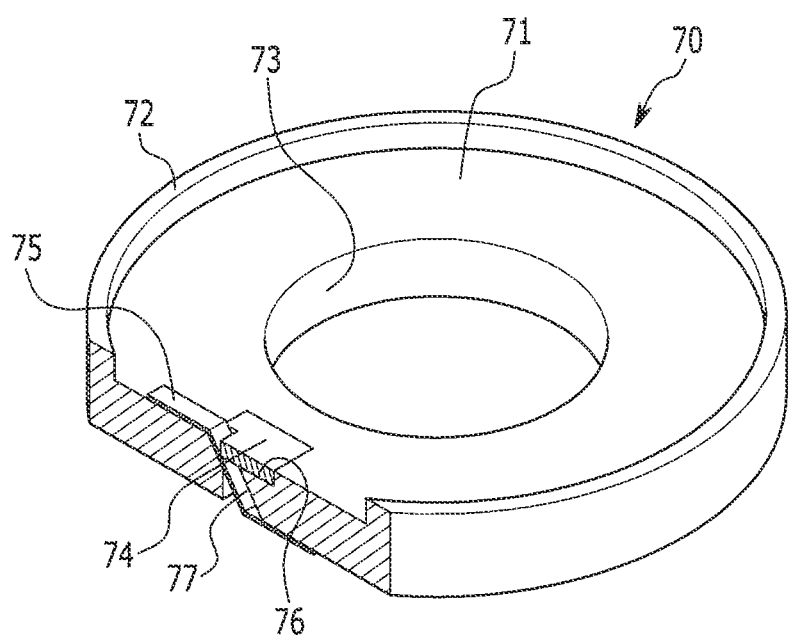
FIG. 5 is a cross-sectional view of the sealing member of FIG. 3, taken along the line V-V.

Referring to FIG. 3 to FIG. 5, the sealing member 70 according to an exemplary embodiment of the present invention includes a base plate 71, a support rib 72 protruding along a side of the base plate 71, and a connection port 75, or connection member, protruding to an upper surface and a lower surface of the base plate 71.

The base plate 71, in one embodiment, is formed having a disk shape, a through-hole 73 into which the second terminal 22 is inserted is formed at the center thereof, and a connection hole 77 into which the connection port 75 is inserted and an installation groove 76 formed on an upper portion of the connection hole 77 are formed at an edge of one side of the base plate 71. The connection hole 77 extends from the upper portion to the lower portion of the base plate 71, and is connected to the installation groove 76 at an upper portion of the connection hole 77. In one embodiment, a cover 74 is rotatably installed at a side end of the installation groove 76, and is insertable into the installation groove 76. When the cover 74 is separated from the installation groove 76 (e.g., in an opened position), the connection hole 77 is exposed to the outside, such that the connection port 75 may be easily installed in the connection hole 77, and after the connection port 75 is inserted, the connection port 75 is fixed by moving the cover 74 into the installation groove 76 (e.g., rotating the cover 74 to a closed position) such that the connection port 75 is not separated.

The sealing member 70 may be formed of a polymer, such as a polymer having elasticity. Accordingly, when the nut 29 is combined with the second terminal 22, the terminal hole 31b may be sealed by pressure applied on the base plate 71.

Figure 6:
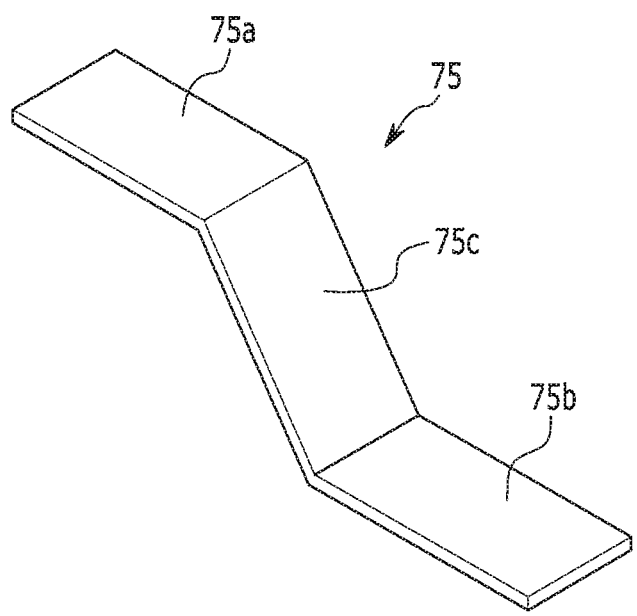
FIG. 6 is a perspective view of a connection port of the sealing member of FIG. 3.

As shown in FIG. 6, the connection port 75, in one embodiment, is formed in a metal plate form, and includes an upper connector 75a protruding to the upper portion of the base plate 71, a lower connector 75b protruding to the lower portion of the base plate 71, and an intermediate connection portion 75c connecting the upper connector 75a and the lower connector 75b.

The upper connector 75a, in one embodiment, is disposed in parallel with the upper surface of the base plate 71 to be adhered to the base plate 71. The intermediate connection portion 75c, in one embodiment, is inclinedly disposed (i.e. oblique) with respect to the upper connector 75a and the lower connector 75b while being bent at the upper connector 75a and the lower connector 75b. The lower connector 75b, in one embodiment, is disposed in parallel with the lower surface of the base plate 71 to be adhered to the base plate 71.

As described above, the cap plate 31 is electrically connected through the nut 29, the connection plate 24, and the connection port 75 to the second terminal 22.

According to an exemplary embodiment of the present invention, the connection port 75 is inserted into the sealing member 70, and the second terminal 22 and the cap plate 31 may easily be electrically connected to each other, and the terminal hole 31b may be stably sealed.

In order to electrically connect a case with a negative electrode or a positive electrode of a rechargeable battery, a method for directly attaching a current collecting tap to the case and a method for electrically connecting a terminal and a cap plate may be applied. In a rechargeable battery where a current collecting tap is directly connected to a case, the structure may be simplified, but a problem is that it is difficult to connect the current collecting tap and the terminal.

In addition, in a rechargeable battery where a terminal and a cap plate are directly connected, since a connection member on the plate formed of metal on the cap plate should be installed to directly contact with the cap plate, a terminal hole may not be sufficiently sealed, such that a problem that an electrolyte solution leaks may occur. When the electrolyte solution leaks, an external short-circuit is induced, such that the rechargeable battery may overheat or explode. In contrast, in the rechargeable battery 101 according to an exemplary embodiment of the present invention, since the connection port 75 is inserted into the sealing member 70, the terminal hole 31b may be stably sealed while the second terminal 22 and the cap plate 31 are electrically connected.

In addition, the connection port 75 that is formed in a thin metal plate form may function as a fuse in a case where an internal short circuit or an external short circuit occurs, and the connection port 75 may thereby block an electrical connection.

Figure 7:
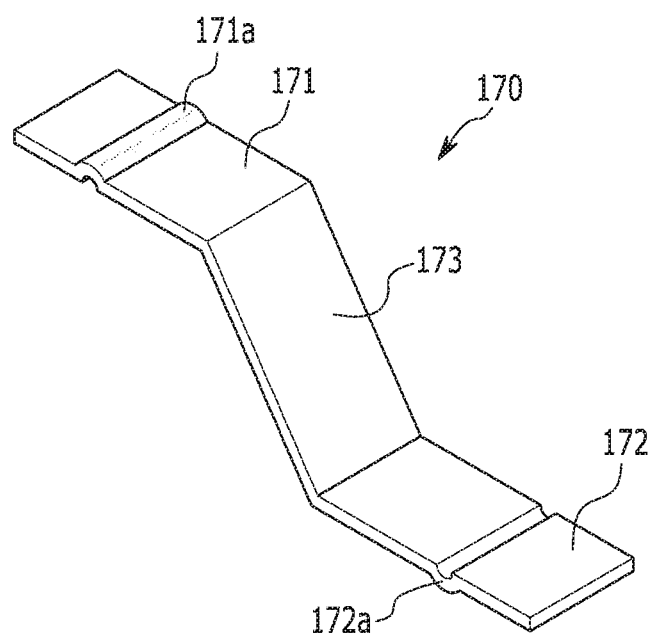
FIG. 7 is a perspective view of a connection port of a sealing member according to another exemplary embodiment of the present invention.

FIG. 7 is a perspective view of a connection port of a sealing member according to another exemplary embodiment of the present invention.

As shown in FIG. 7, a connection port 170, or connection member, according to another exemplary embodiment of the present invention is formed in a metal plate form, and includes an upper connector 171 protruding to the upper portion of the base plate 71, a lower connector 172 protruding to the lower portion of the base plate 71, and an intermediate connection portion 173 connecting the upper connector 171 and the lower connector 172.

A protrusion 171a protruding away from the cap plate 31 (e.g., upward) is formed on the upper connector 171, and a protrusion 172a protruding toward the cap plate 31 disposed at the lower portion is formed on the lower connector 172.

The protrusion 171a, in one embodiment, is formed by bending the upper connector 171, and when the protrusion 171a is pressed by the nut 29, the protrusion 171a is elastically deformed to be adhered to the connection plate 24. In one embodiment, the protrusion 172a is formed by bending the lower connector 172, and when the protrusion 172a is pressed by the nut 29, the protrusion 172a is elastically deformed to be adhered to the cap plate 31.

In one embodiment, the protrusions 171a and 172a that are elastically deformable are formed on the upper connector 171 and the lower connector 172, and the protrusions 171a and 172a are adhered to the connection plate 24 or the cap plate 31, such that contact resistance is decreased. Accordingly, the connection port 170 may more stably connect the second terminal 22 and the cap plate 31.

Figure 8:
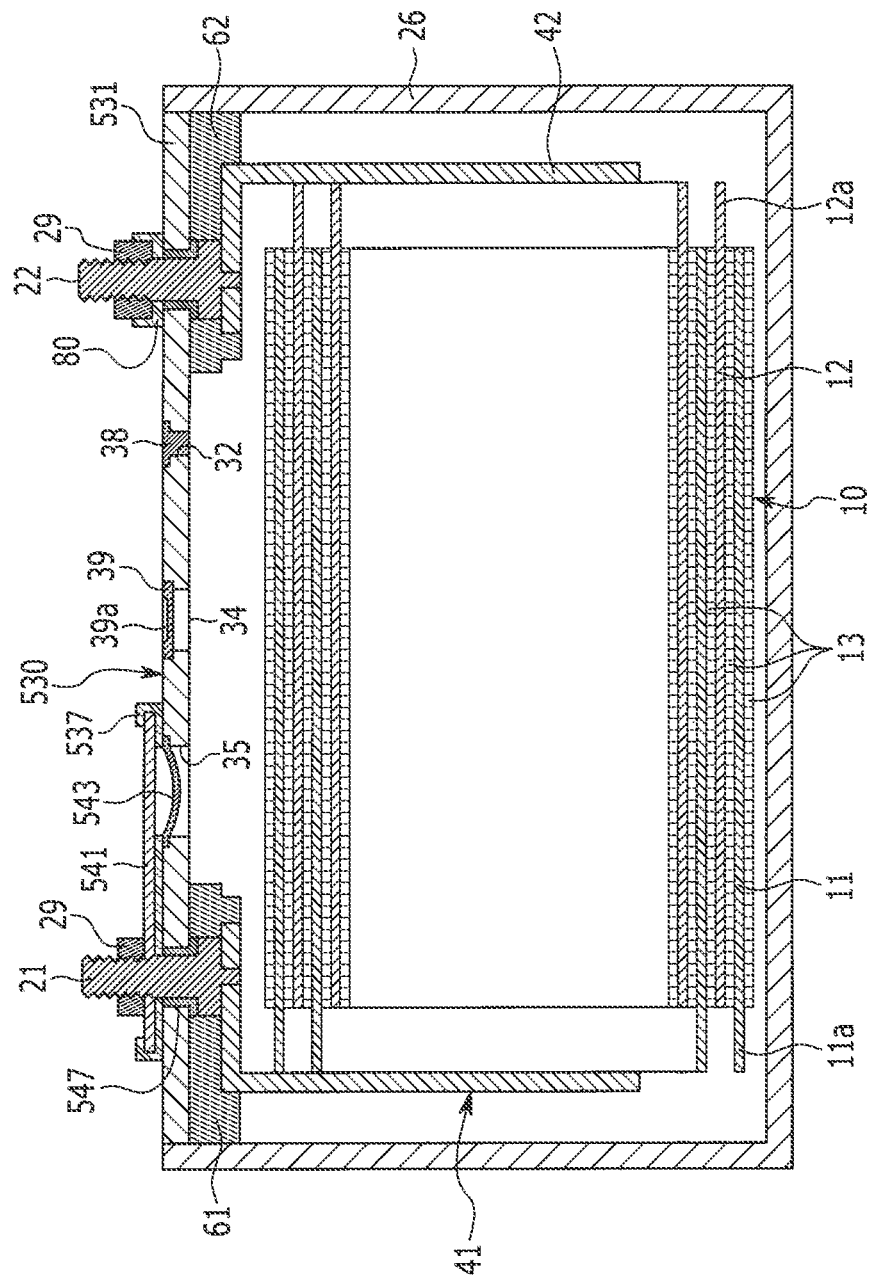
FIG. 8 is a cross-sectional view of a rechargeable battery according to another exemplary embodiment of the present invention.
Figure 9:
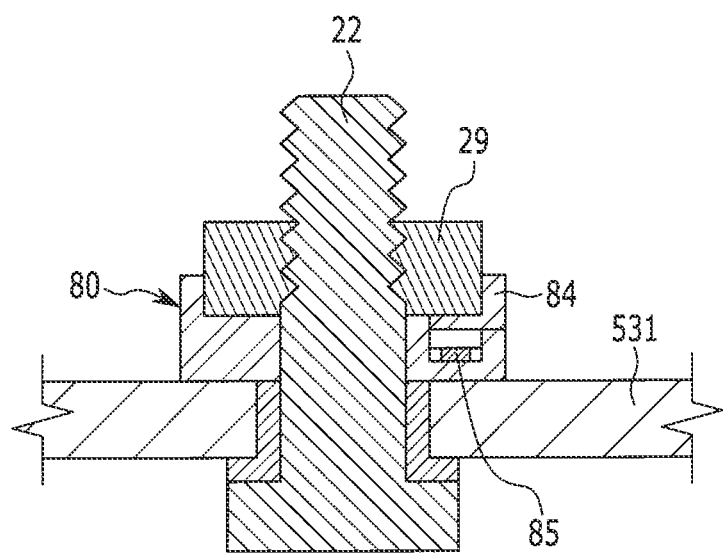
FIG. 9 is a partial cross-sectional view of the rechargeable battery of FIG. 8, taken along another direction.

FIG. 8 is a cross-sectional view of a rechargeable battery according to another exemplary embodiment of the present invention, and FIG. 9 a partial cross-sectional view of the rechargeable battery of FIG. 8, taken along another direction.

Referring to FIG. 8 and FIG. 9, a rechargeable battery 102 according to another exemplary embodiment of the present invention has a same or substantially same structure as the rechargeable battery 101 described above except for a structure of a cap assembly 530, and further description of the same components and structures will therefore be omitted.

The cap assembly 530 includes a cap plate 531 covering the opening of the case 26, the first terminal 21 that protrudes to the outside of the cap plate 531 and is electrically connected to the negative electrode 11, and the second terminal 22 that protrudes to the outside of the cap plate 531 and is electrically connected to the positive electrode 12.

In one embodiment, the first terminal 21 and the second terminal 22 are installed to protrude to the upper portion of the cap plate 531, the first terminal 21 is electrically connected to the negative electrode 11 via the current collecting tap 41, and the second terminal 22 is electrically connected to the positive electrode 12 via the current collecting tap 42.

A lower gasket 547 for sealing is inserted into a hole of the cap plate 531 through which the first terminal 21 penetrates between the first terminal 21 and the cap plate 531, and a lower insulating member 61 for insulating the first terminal 21 and the current collecting tap 41 from the cap plate 531 is installed under the cap plate 531.

In one embodiment, a short-circuit tap 541 is electrically connected to the first terminal 21, and the short-circuit tap 541 is installed on the cap plate 531. An upper insulating member 537 for electrically insulating the short-circuit tap 541 and the cap plate 531 is installed between the short-circuit tap 541 and the cap plate 531. The upper insulating member 537 is disposed under the short-circuit tap 541, and supports the short-circuit tap 541 while covering a side end of the short-circuit tap 541. The short-circuit tap 541 is electrically connected to the first terminal 21 via the nut 29 installed on the upper portion.

Another lower gasket 547 for sealing is inserted into a hole of the cap plate 531 through which the second terminal 22 penetrates between the second terminal 22 and the cap plate 531, and a lower insulating member 62 for insulating the second terminal 22 and the current collecting tap 42 from the cap plate 531 is installed under the cap plate 531.

The cap assembly 530 includes a short-circuit member 543 for short circuiting the negative electrode 11 and the positive electrode 12, and the short-circuit member 543 is electrically connected to the cap plate 531 and is configured to deform when an internal pressure of the rechargeable battery 102 is increased to a certain pressure (e.g., a reference pressure), such that the short-circuit member 543 is connected to the short-circuit tap 541 electrically connected to the negative electrode 11.

A short-circuit hole 35 is formed in the cap plate 531, and the short-circuit member 543 is disposed between the upper insulating member 537 and the cap plate 531 in the short-circuit hole 35. The short-circuit member 543 may be formed of an arc-shaped curved portion that is convex downward and an inversion plate that is provided with a circumference portion that is fixed to the cap plate 531.

The cap plate 531 is electrically connected to the second terminal 22, such that the short-circuit member 543 is configured to also be electrically connected to the second terminal 22 through the cap plate 531. When the internal pressure of the rechargeable battery 102 is increased to a certain pressure, the short-circuit member 543 is inverted and contacts the short-circuit tap 541, such that a short circuit occurs.

As described above, in order to cause the short circuit, the cap plate 531 is electrically connected to the second terminal 22, and in an exemplary embodiment, the second terminal 22 and the cap plate 531 are electrically connected by using a sealing member 80.

A sealing member 80 for sealing is inserted with the second terminal 22, and the sealing member 80 is disposed under the nut 29 to be adhered to the upper surface of the cap plate 531, and seals the hole of the cap plate 531 into which the second terminal 22 is inserted.

Figure 11:
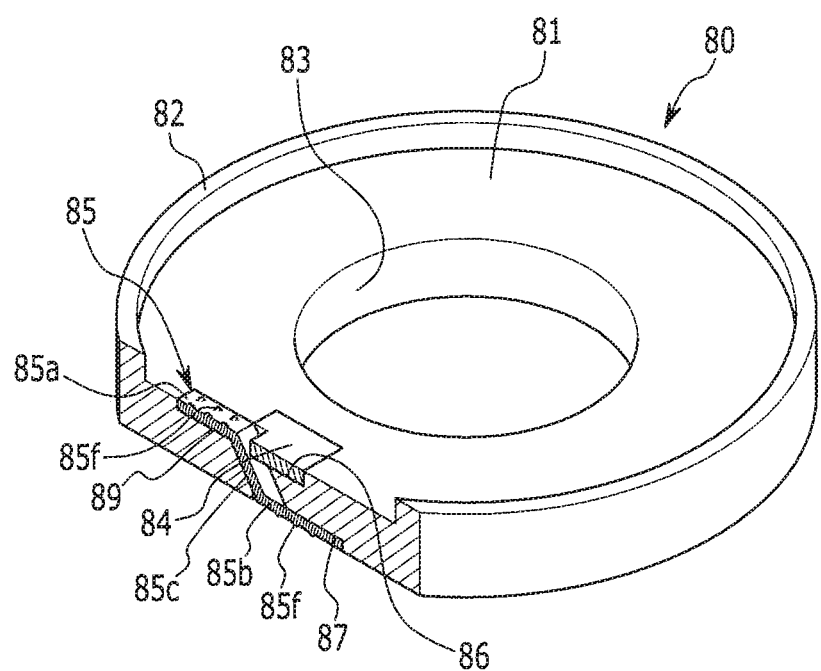
FIG. 11 is a perspective view of a sealing member of the rechargeable battery of FIG. 8, showing a cross-section of the connection port of FIG. 10.

With reference to FIG. 11, the sealing member 80 according to an exemplary embodiment of the present invention includes a base plate 81, a support rib 82 protruding along a side end of the base plate 81, and a connection port 85, or connection member, protruding to an upper surface and a lower surface of the base plate 81.

The base plate 81, in one embodiment, is formed having a disk shape, a through-hole 83 into which the second terminal 22 is inserted is formed at the center thereof, and a connection hole into which the connection port 85 is inserted and an installation groove 86 formed on an upper portion of the connection hole are formed at an edge of one side of the base plate 81. The connection hole is connected from the upper portion to the lower portion of the base plate 81 and is connected to the installation groove 86 at the upper portion of the connection hole 87. A cover 84 is installed to be bent at a side end of the installation groove 86 and is inserted into the installation groove 86.

The sealing member 80 may be formed of a polymer, such as a polymer having elasticity. Accordingly, when the nut 29 is combined with the second terminal 22, the terminal hole of the cap plate 531 through which the second terminal 22 protrudes may be sealed by pressure applied on the base plate 81.

Figure 10:
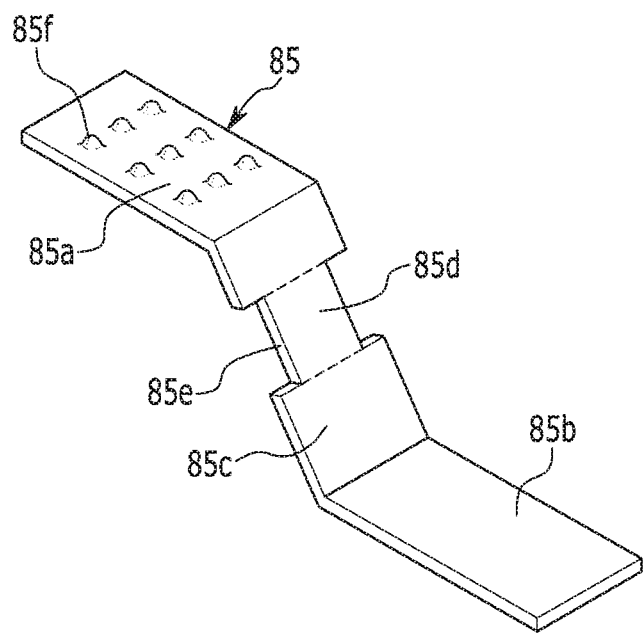
FIG. 10 is a perspective view of a connection port of a sealing member of the rechargeable battery of FIG. 8.

As shown in FIG. 10 and FIG. 11, the connection port 85 is formed in a metal plate form, and includes an upper connector 85a exposed to the upper portion of the base plate 81, a lower connector 85b exposed to the lower portion of the base plate 81, and an intermediate connection portion 85c connecting the upper connector 85a and lower connector 85b.

In one embodiment, the upper connector 85a is inserted into a groove 89 formed on the upper surface of the base plate 81, and the lower connector 85b is inserted into a groove 87 formed on the lower surface of the base plate 81. The intermediate connection portion 85c, in one embodiment, is inclinedly disposed (i.e. oblique) with respect to the upper connector 85a and the lower connector 85b while being bent at the upper connector 85a and the lower connector 85b.

In one embodiment, a plurality of connection protrusions 85f protruding upwardly are formed on the upper connector 85a, and a plurality of connection protrusions 85f protruding downwardly are formed on the lower connector 85b. When the upper connector 85a and the lower connector 85b are inserted into the grooves 89, 87, the occurrence of gaps may be prevented or substantially prevented because of the connection protrusions 85f of the connection port 85.

In one embodiment, a fuse portion 85d having a smaller cross-sectional area than surrounding portions is formed on the intermediate connection portion 85c. The fuse portion 85d, in one embodiment, has the smaller cross-sectional area than the surrounding portions due to a groove 85e being formed on the fuse portion 85d. In the rechargeable battery 102, when the short-circuit member 543 contacts with the short-circuit tap 541 to produce a short circuit, current is rapidly increased, such that the fuse portion 85d is melted to block the current.

In addition, as described above, the cap plate 531 is electrically connected through the nut 29 and the connection port 85 to the second terminal 22. In the rechargeable battery 102, when the connection port 85 is inserted into the sealing member 80, the second terminal 22 and the cap plate 531 may easily be electrically connected, and further, the terminal hole of the cap plate 531 may be stably sealed.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
   an electrode assembly comprising a positive electrode and a negative electrode:
   a case containing the electrode assembly;
   a cap plate covering an opening of the case;
   a terminal electrically connected to the electrode assembly; and
   a sealing member on the cap plate to seal between the terminal and the cap plate, the sealing member comprising a connection member arranged therein and electrically connecting terminal and the cap plate,
   wherein the sealing member comprises a base plate, and the connection member comprises an upper connector protruding to an upper portion of the base plate, a lower connector protruding to a lower portion of the base plate, and an intermediate connection portion inserted in the base plate and connecting the upper connector and the lower connector.

2. The rechargeable battery of claim 1, wherein the connection member comprises a metal plate, and the intermediate connection portion is oblique with respect to the upper connector and the lower connector and bent at the upper connector and the lower connector.

3. The rechargeable battery of claim 1, wherein the upper connector comprises a protrusion protruding upwardly therefrom, and the lower connector comprises a protrusion protruding downwardly therefrom.

4. The rechargeable battery of claim 3, wherein at least one of the protrusions is formed by bending at least one of the upper connector or the lower connector.

5. The rechargeable battery of claim 1, wherein the connection member comprises a fuse having a smaller cross-sectional area than surrounding portions.

6. The rechargeable battery of claim 1, wherein the base plate has a through-hole into which the terminal is inserted.

7. The rechargeable battery of claim 1, wherein the base plate has a connection hole into which the connection member is inserted, and an installation groove formed on the connection hole.

8. The rechargeable battery of claim 7, wherein the sealing member further comprising a cover that is rotatably installed with respect to the base plate and is insertable into the installation groove.

9. The rechargeable battery of claim 1, wherein the base plate has a groove into which the upper connector is inserted.

10. The rechargeable battery of claim 1, further comprising a nut coupled to the terminal and installed, on the sealing member, wherein the connection member is electrically connected to the terminal via the nut.

11. The rechargeable battery of claim 1, further comprising a connection plate on the sealing member and into which the terminal is inserted, wherein the connection member is electrically connected to the terminal via the connection plate.

12. The rechargeable battery of claim 1, wherein:
   the terminal is a first terminal,
   the sealing member is electrically connected to the first terminal, and
   the rechargeable battery further comprises a second terminal, a short-circuit tap electrically connected to the second terminal, and a short-circuit member electrically connected to the cap plate and deformable due to an increase in an internal pressure of the case to be electrically connected to the short-circuit tap.

13. The rechargeable battery of claim 1, wherein the rechargeable battery is adapted for use as a motor-driving power source for propelling an electric vehicle or a hybrid electric vehicle.

* * * * *